United States Patent [19]

Pine et al.

[11] 4,454,241

[45] Jun. 12, 1984

[54] PHOSPHORUS-CONTAINING CATALYST

[75] Inventors: Lloyd A. Pine, Baton Rouge; Neville L. Cull, Baker, both of La.

[73] Assignee: Exxon Research and Engineering Co., Florham Park, N.J.

[21] Appl. No.: 381,388

[22] Filed: May 24, 1982

[51] Int. Cl.$^3$ .................. B01J 29/08; B01J 21/16
[52] U.S. Cl. ........................ 502/68; 502/214
[58] Field of Search .............. 252/435, 437, 455 Z; 502/68, 214

[56] References Cited

U.S. PATENT DOCUMENTS

| | | | |
|---|---|---|---|
| Re. 28,629 | 11/1975 | Maher et al. | 423/112 |
| 3,354,096 | 11/1967 | Young | 252/455 Z |
| 3,375,065 | 3/1968 | McDaniel et al. | 23/112 |
| 3,595,611 | 7/1971 | McDaniel et al. | 23/111 |
| 3,663,165 | 5/1972 | Haden, Jr. et al. | 252/455 Z |
| 3,676,368 | 7/1972 | Scherzer et al. | 252/455 Z |
| 3,781,199 | 12/1973 | Ward | 208/89 |
| 3,943,233 | 3/1976 | Swanson et al. | 423/332 |
| 4,036,739 | 7/1977 | Ward | 208/120 |
| 4,048,284 | 8/1977 | Horton et al. | 423/112 |

FOREIGN PATENT DOCUMENTS 1524123   9/1978   United Kingdom .

*Primary Examiner*—Carl F. Dees
*Attorney, Agent, or Firm*—Marthe L. Gibbons

[57] ABSTRACT

A phosphorus-containing low alkali metal content zeolitic catalyst made from a clay starting material is provided. The catalyst is obtained by contacting a partially cation exchanged calcined zeolite-containing catalyst with a dihydrogen phosphate anion or a dihydrogen phosphite anion. A hydrocarbon catalytic cracking process utilizing the phosphorus-containing catalyst is also provided.

28 Claims, No Drawings

PHOSPHORUS-CONTAINING CATALYST

BACKGROUND OF THE INVENTION

1. Field of the Invention

The present invention relates to a phosphorus-containing catalyst prepared from a clay starting material and to a hydrocarbon catalytic cracking process utilizing the catalyst.

2. Description of the Prior Art

Catalytic cracking processes in which a hydrocarbonaceous oil is converted to lower boiling hydrocarbon products in the presence of cracking catalysts are well known. Catalysts comprising a zeolite and a silica-alumina residue made from a calcined clay starting material in which the zeolite is produced in the clay are known. See, for example, U.S. Pat. No. 3,663,165, the entire content of which is hereby incorporated by specific reference.

It is also known to produce low alkali metal content zeolites by cation exchanging, followed by calcination at a temperature of 400° to 1500° F. followed by at least an additional ion exchange step. See, for example, U.S. Pat. No. Re. 28,629 which is a reissue of U.S. Pat. No. 3,402,996, the teachings of which are hereby incorporated by specific reference.

U.S. Pat. No. 3,943,233 discloses a continuous method of ion exchanging microspheres containing zeolites in sodium form (i.e. calcined clay derived catalysts) in which sodium form zeolite-containing microspheres are first slurried in a spent ion exchange solution, which accomplishes preliminary ion exchange (column 3, lines 16–18). The bulk of the solution is drained and the main ion exchange is carried out with fresh ion exchange solution followed by draining and washing the microspheres.

U.S. Pat. No. 4,048,284 discloses multistage ion exchanging of sodium on zeolite-containing microspheres.

British Pat. No. 1,524,123 discloses the preparation of a clay derived zeolite. The sodium content of the catalyst is reduced to less than about 1 weight percent by either of two exchange processes. In the second process, the product is exchanged twice with ammonium sulfate solution and once with rare earth metal salt solution.

U.S. Pat. No. 3,595,611 discloses reducing the sodium content of the zeolite via steps of ammonium exchange, then rare earth exchange, calcination and further ammonium exchange. Example 4 describes applying this ion exchange method to a faujasite prepared from calcined clay.

U.S. Pat. No. 3,375,065 discloses cation exchanging a zeolite by a sequence which comprises cation exchange with ammonium ions, followed by heat treatment at a temperature above 350° F., and further cation exchange with ammonium, followed by cation exchange with magnesium, rare earth and mixtures thereof.

U.S. Pat. No. 3,676,368 discloses a sequence of ion exchanging a zeolite with rare earth ions, calcination of the exchanged zeolite, and exchanging the calcined zeolite with ammonium ions. The final exchange may be conducted on the zeolite alone or on the zeolite incorporated in a conventional matrix.

U.S. Pat. No. 4,036,739 discloses hydrothermally stable and ammonia stable Y zeolite in which a sodium Y zeolite is ion exchanged to partially exchange sodium ions for ammonium ions, steam calcined and further ion exchanged with ammonium ions to reduce the final sodium oxide content to below 1 weight percent, and calcining the reexchanged product, or according to U.S. Pat. No. 3,781,199, the second calcination may be conducted after the zeolite is admixed with the refractory oxide.

It has now been found that a catalyst comprising a clay derived zeolite and phosphorus prepared by a specified method has increased activity for cracking hydrocarbonaceous feeds.

SUMMARY OF THE INVENTION

In accordance with the invention, there is provided a catalyst comprising a crystalline alumino-silicate zeolite prepared from a clay starting material, a residue derived from said clay, and an effective amount of phosphorus, said catalyst having been prepared by the steps which comprise: (a) ion exchanging a clay derived alkali metal-containing Y-type crystalline aluminosilicate zeolite and the clay derived residue with a cation of a non-alkali metal to decrease the alkali metal content of said alkali metal-containing zeolite; (b) calcining the resulting ion exchanged zeolite and clay derived residue, and (c) contacting the resulting calcined zeolite and clay derived residue with a medium comprising an anion selected from the group consisting of dihydrogen phosphate anion, dihydrogen phosphite anion and mixtures thereof for a time sufficient to composite an effective amount of phosphorus with said calcined zeolite and residue.

In accordance with the invention there is also provided a hydrocarbon catalytic cracking process utilizing the above-stated catalyst.

DETAILED DESCRIPTION OF THE INVENTION

The catalyst of the present invention comprises a Y-type crystalline aluminosilicate zeolite derived from a clay starting material and the clay derived residue (e.g. silica-alumina) which remains associated with the zeolite when it crystallizes in the clay starting material. The catalyst comprising an effective amount of phosphorus to enhance the activity of the catalyst relative to the same catalyst without the incorporation of phosphorus by the specified method. Suitable amounts of phosphorus present in the catalyst include from at least about 0.1 weight percent, preferably from at least about 0.2 weight percent, more preferably from about 0.5 to about 0.8 weight percent phosphorus, calculated as elemental metal, based on the weight of the zeolite plus clay derived residue. The required amount of phosphorus will in part depend on the zeolite content of the catalyst. Thus, for a catalyst comprising from about 15 to 20 weight percent zeolite, amounts of phosphorus ranging from about 0.2 to about 0.8 weight percent based on the weight of the zeolite plus clay residue will be desirable. By "Y-type zeolite" is intended herein a crystalline aluminosilicate zeolite having the structure of faujasite and having a silica to alumina mole ratio of at least about 3:1. The catalyst of the present invention is characterized by its method of preparation to incorporate the phosphorus component. The Y-type crystalline aluminosilicate can be prepared by any known method of preparing a zeolite from clay and an additional source of silica to produce the high silica to alumina Y-type zeolite. The additional source of silica may be, for example, an alkali metal silicate salt or added exothermed koalin or an aqueous silica sol. Known methods of preparation include use of reaction mixtures containing clay and sodium silicate and subsequent treatment with sodium hydroxide to form the zeolite; treatment of mixtures of exothermed kaolin and metakaolin with sodium hydroxide to form the zeolite. Zeolitic catalysts made from a clay starting material are commercially available. See, for example, *Chemical Week*, July 26, 1978, pages 42–44, in which Engelhard's in situ produced zeolitic catalysts made from a kaolin starting material are described. The commercially available zeolite-containing catalysts made from a clay starting material have usually been subjected to at least one conventional cation exchange step to reduce the alkali metal content generally to slightly below 1 weight percent, calculated as the alkali metal oxide, based on the total catalyst. After the conventional cation exchange step, as is known in the art, the catalyst may be subjected to a dry or wet (steam) calcination prior to its use. In accordance with the present invention, a catalyst comprising a Y-type zeolite prepared from a clay starting material, including the remaining clay derived residue, and which has been subjected to a first ion exchange with a hydrogen ion or hydrogen ion precursor to partially reduce the alkali metal content thereof is calcined at a temperature and for a time sufficient to decrease the unit cell size of the Y-type zeolite from its initial value of above about 24.5 angstroms, which value may be as high as 24.7 angstroms, to a lower unit cell size. For example, the difference between the initial unit cell size of the zeolite and the unit cell size of the zeolite resulting from the calcination may range from about 0.05 to about 0.10 angstroms. Suitable calcination temperatures range from about 500° F. to about 1400° F., preferably from about 600° F. to about 1200° F., in air (dry) or in the presence of steam. The calcined Y-type zeolite, including the clay derived residue, is contacted with a medium containing an anion selected from the group consisting of a dihydrogen phosphate anion ($H_2PO_4^-$), a dihydrogen phosphite anion ($H_2PO_3^-$) and mixtures thereof for a time sufficient to composite phosphorus, with the catalyst. Suitable amounts of phosphorus to be incorporated in the catalyst include at least about 0.1 weight percent, preferably at least about 0.2 weight percent, more preferably from about 0.5 to 0.8 weight percent, calculated as elemental phosphorus, based on the weight of the zeolite plus whatever clay derived residue remains associated with the zeolite when it is prepared from clay. The amount of phosphorus required to produce a catalyst having increased activity for the conversion of hydrocarbons will vary depending on the amount of zeolite present in a particular catalyst. The anion is derived from a phosphorus-containing component selected from the group consisting of inorganic acids of phosphorus, salts of inorganic acids of phosphorus, and mixtures thereof. Suitable phosphorus-containing components include phosphorous acid ($H_3PO_3$), phosphoric acid ($H_3PO_4$), salts of phosphorous acid, salts of phosphoric acid and mixtures thereof. Although any soluble salts of phosphorous acid and phosphoric acid, such as alkali metal salts and ammonium salts may be used to provide the dihydrogen phosphate or phosphite anion, it is preferable to use ammonium salts since the use of alkali metal salts would require subsequent removal of the alkali metal from the catalyst. Preferably, the anion is a dihydrogen phosphate anion derived from monoammonium phosphate, diammonium phosphate and mixtures thereof. Contact with the anion may be performed as at least one step of contacting or a series of contacts which may be a series of alternating calcinations and dihydrogen phosphate or phosphite anion contacting steps. Contact of the anion with the zeolite and clay derived residue is suitably conducted at a pH ranging from about 2 to about 8. The lower pH limit is selected to minimize loss of crystallinity of the zeolite. The upper pH limit appears to be set by the effect of the anion concentration. Suitable concentrations of the dihydrogen phosphate or dihydrogen phosphite anion in the liquid medium range from about 0.2 to about 10.0 weight percent anion. The lower limit is chosen to provide the desired lower limit of phosphorus in the catalyst. Although the upper limit is not critical, a concentration above the stated upper limit would not be necessary. The chosen concentration of the anion in the solution will also depend on the amount of solution used per weight of zeolite and clay residue being treated. Treating time and temperatures are not critical and may range from about ambient temperature, that is, from 60° F. to about 250° F. If desired, the resulting phosphorus-containing clay derived Y-type zeolite and clay residue (e.g. predominantly, silica and alumina) may be composited with other components generally used in cracking catalysts, either as matrices, binders, catalytic components, inert components, such as clay; inorganic oxides such as silica; alumina; silica-alumina; zirconia; titania; magnesia; boria; etc. Alternatively, the clay derived zeolite and clay derived residue may be first composited with the additional catalystic components such as silica or silica-alumina and subsequently contacted with a dihydrogen phosphate anion or dihydrogen phosphite anion. The anion contacting step of the present invention may be carried out on any of the known catalysts in which the zeolite is derived from a clay starting material. Such catalysts generally comprise zeolite crystals in a matrix of silica-alumina residue of calcined kaolin clay. The preferred clay derived zeolite to produce the catalyst of the present invention is one made as described in U.S. Pat. No. 3,663,165.

One method of making a suitable catalyst is as follows: a zeolitic catalyst that was made by forming a zeolite in a preformed calcined kaolin clay and that has been cation exchanged with a non-alkali metal cation such as hydrogen ions, hydrogen ion precursors, e.g. ammonium ions and mixtures thereof, to reduce its alkali metal oxide content, to at least about 1.5 weight percent preferably to below 1.0 weight percent calculated as alkali metal oxide, based on zeolite and clay residue is calcined at a temperature between 600° and 1200° F., in a dry or wet atmosphere. The ion exchanged calcined catalyst is then contacted with a solution comprising an ammonium salt of a phosphoric acid such as monoammonium phosphate. The contacting step which may be considered as second cation exchange may be one stage of exchange or series of ion exchanges. If desired, after the final exchange step, the catalyst may be calcined again. Furthermore, if desired, the final composite catalyst may be contacted with a solution comprising rare earth metal components to incorporate rare earth metal components into the catalyst. The resulting catalyst may be used as such or it may be additionally composited with other catalyst components or binders.

The amount of zeolite present in the composite catalyst may range from about 2.0 to about 70 weight percent, preferably at least about 10 weight percent, more preferably above about 15 weight percent.

A preferred method of making a suitable catalyst for use in the process of the present invention is as follows: a catalyst in microspherical form is prepared by forming a suspension comprising: (a) microspheres comprising calcined kaolin clay which has undergone the kaolin exotherm, (b) an aqueous solution of an alkali metal hydroxide, for example, sodium hydroxide, and optionally, but preferably, also (c) powdered metakaolin; aging the suspension; subjecting the suspension to agitation, heating the suspension until a faujasite zeolite type crystals form in the microsphere (above about 15 percent, preferably above about 20 percent) and an alkali metal silicate (e.g. sodium silicate) mother liquor is formed, separating microspheres comprising crystalline alkali metal faujasite crystals from an aqueous phase of the suspension, decreasing the alkali metal content of the microspheres by ion exchange with a non-alkali metal cation to decrease the alkali metal content of the microspheres. The ion exchange may be conducted by contacting the microspheres with the solution containing hydrogen ion or hydrogen ion precursors such as, for example, ammonium ion, and mixtures thereof, in any conventional method known in the art. The exchanged microspheres are dried and may be calcined, dry or wet (steam) prior to use. Such a catalyst is described in U.S. Pat. No. 3,663,165. The term "faujasite" is used herein to designate zeolites having the structure of naturally occurring faujasite, of zeolite X (described in U.S. Pat. No. 2,882,244) and zeolite Y (described in U.S. Pat. No. 3,130,007). Preferably, a Y-type zeolite is formed in situ in the clay. In accordance with the present invention, the conventional first ion exchange step is carried out until the alkali metal content of the catalyst, calculated as alkali metal oxide, is not greater than about 1.5 weight percent, preferably below 1 weight percent to effect partial removal of the alkali metal. It should be noted that the given alkali metal oxide level after the first ion exchange is the preferred alkali metal level for catalysts comprising between 15 to 20 weight percent zeolite. For catalysts comprising other amounts of zeolite, a suitable alkali metal oxide level after the first ion exchange will range from about 2 to about 4 weight percent alkali metal oxide based on the weight of the zeolite alone. The ion exchanged catalyst is then calcined, preferably dry or in the presence of steam and at a temperature ranging from about 500° to about 1400° F., preferably from about 600° to about 1200° F. The calcined partially exchanged catalyst is then contacted with a solution comprising a dihydrogen phosphite anion or a dihydrogen phosphate anion, e.g. an ammonium salt of phosphoric acid, until at least 0.1 weight percent phosphorus are associated with the catalyst (i.e. zeolite plus silica-alumina residue of the clay). The anion contacting treatment after the first calcination may be performed as one stage of contact or as a series of anion contacting steps with or without alternating calcination. Suitable anion contacting solution temperatures range from about 60° F. to about 250° F. After the final anion contacting step, the resulting catalyst may be calcined prior to use or in the catalytic cracking unit during use of the catalyst.

The catalyst of the present invention is suitable for catalytic cracking of hydrocarbonaceous oil feeds. Catalytic cracking with the catalyst of the present invention can be conducted in any of the conventional catalytic cracking manners utilizing conventional feeds well known for use in catalytic cracking processes which are conducted in the absence of added hydrogen. Suitable catalytic cracking conditions include a temperature ranging from about 750° to 1300° F., a pressure ranging from about 0 to 150 psig, preferably from about 0 to about 45 psig. The catalytic cracking process may be carried out as a fixed bed, moving bed, ebullated bed, slurry, transferline (dispersed phase) or fluidized bed operation. The catalyst of the present invention is especially suited for use in the fluidized bed and transferline catalytic cracking processes. The catalyst may be regenerated at conditions which include a temperature in the range of about 1100° F. to about 1500° F., preferably from about 1175° F. to about 1350° F.

Suitable feeds for the catalytic cracking processes of the present invention are hydrocarbonaceous oils ranging from a naphtha boiling range to heavy hydrocarbonaceous oils boiling above about 650° F. at atmospheric pressure, including residua.

The hydrocarbonaceous oils may be derived from any source such as petroleum; liquids derived from coal liquefaction processes, including coal liquefaction bottoms; shale oils; tars and oils, etc. The catalyst is particularly suited for cracking hydrocarbon mixtures having an atmospheric pressure boiling point ranging from an initial boiling point from about 450° F. or 650° F. to a final boiling point about 1050° F., such as gas oils.

PREFERRED EMBODIMENTS

The following examples are presented to illustrate the invention.

EXAMPLE 1

This example shows that calcination prior to treatment with a dihydrogen phosphate anion is required.

A catalyst, herein designated Catalyst A, was treated for 2 hours at room temperature with an aqueous solution containing 1.3 weight percent monoammonium phosphate, herein designated "MAP".

Catalyst A was a commercially available catalyst made from a calcined kaolin starting material and comprising about 20 wt. % Y-type zeolite in a matrix comprising a silica-alumina residue of caustic leached exothermed kaolin clay. Catalyst A had an alkali metal content of about 0.51 weight percent, calculated as alkali metal oxide, based on the total catalyst and a phosphorus content of essentially zero.

Catalyst A was calcined at various temperatures prior to treatment with MAP. The resulting catalysts were tested for activity in a standard microactivity test herein after designed "MAT". The microactivity test is described in Oil and Gas Journal, 1966, Vol. 64., pages 7, 84 and 85, and Nov. 22, 1971, pages 60–68. The microactivity test was performed on the catalysts after heating the catalysts for 16 hours at 1400° F. in one atmosphere of steam.

The conditions and results of these experiments are shown in Table I.

TABLE I

CALCINING REQUIRED FOR EFFECTIVE MAP TREATMENT
Catalyst A, 2 Hr. Treat at Room Temp., 1.3 Wt. % MAP

| | Calcination | | Calcined Catalyst | | MAP Treated, Steamed Catalyst Inspection | | |
|---|---|---|---|---|---|---|---|
| Run No. | Time, Hrs | Temp., °F. | Unit Cell Å | Crystallinity[1] % | Wt. % P | MAT LV% | Surface Area, m²/g |
| 1 | 0 | 0 | — | — | 0.19 | 64.3 | 178 |
| 2 | 4 | 400 | 24.67 | 23† | 0.23 | 60.5 | 188 |

TABLE I-continued
CALCINING REQUIRED FOR EFFECTIVE MAP TREATMENT
Catalyst A, 2 Hr. Treat at Room Temp., 1.3 Wt. % MAP

| Run No. | Calcination Time, Hrs | Calcination Temp., °F. | Calcined Catalyst Unit Cell Å | Calcined Catalyst Crystallinity[1] % | MAP Treated, Steamed Catalyst Inspection Wt. % P | MAT LV% | Surface Area, $m^2/g$ |
|---|---|---|---|---|---|---|---|
| 3 | 4 | 600 | 24.64 | — | 0.34 | 67.8 | 171 |
| 4 | 4 | 700 | 24.60 | 152 | — | 71.2 | 174 |
| 5 | 4 | 800 | — | — | 0.46 | 72.6 | 180 |
| 6 | 4 | 800 | 24.55 | 137 | — | 72.2 | 174 |
| 7 | 4 | 1000 | — | — | 0.88 | 74.4 | 186 |
| 8 | 4 | 1200 | — | — | 0.51 | 71.5 | 175 |

Runs 3, 4, 5, 6, 7 and 8 were in accordance with the present invention. Runs 1 and 2 were not in accordance with the present invention. As can be seen from Table I, Runs 3, 4, 5, 6, 7 and 8 utilizing a catalyst in accordance with the present invention had a greater activity in the microactivity test, MAT, than runs 1 and 2 in which the catalyst used was not a catalyst in accordance with the present invention.

EXAMPLE 2

This example shows that only certain phosphorus-containing components are effective as reagent and that the effective components yield a dihydrogen phosphate anion under treatment conditions.

Catalyst A described in Example 1, was treated with various phosphorus-containing components and tested for catalytic activity by the standard microactivity test MAT. Conditions and results of these tests are summarized in Table II.

TABLE II
TREATMENT OF CATALYST A WITH PHOSPHATE ANIONS
1-2 Hr. Treat, Solutions Equivalent to 0.17 Wt. % MAP

| Run | 9 | 10 | 11 | 12 | 13 |
|---|---|---|---|---|---|
| Reagent | $H_3PO_4$ $H_2SO_4$ | $H_3PO_4$ | MAP | MAP $NH_3$ Added | MAP $NH_3$ Added |
| Initial pH | 1.5 | 2.2 | 4.4 | 7.6 | 8.2 |
| Final pH | 2.5 | 4.8 | 4.4 | 5.7 | 6.0 |
| Anion Conc., Mol/l | | | | | |
| $H_3PO_4$ | .0083 | $5.86 \times 10^{-4}$ | $7.64 \times 10^{-5}$ | $10^{-7}$ | $10^{-9}$ |
| $H_2PO_4^{-1}$ | .0062 | .0139 | .0144 | .0116 | .0081 |
| $HPO_4^{-2}$ | $10^{-8}$ | $10^{-6}$ | $2.24 \times 10^{-5}$ | .0029 | .0064 |
| MAT, LV% | 50.4 | 70.0 | 70.5 | 68.5 | 69.6 |
| P, Wt. % | .14 | .34 | .36 | .23 | .23 |
| $Na_2O$, Wt. % | 10 | .47 | .47 | .48 | .47 |

Runs 10, 11, 12 and 13 were runs in accordance with the present invention. In run 9, the catalyst used was not made in accordance with the present invention. As can be seen from the data in Table II, the activity as determined by the microactivity test, MAT, was greater for the runs which were in accordance with the present invention.

Catalyst A was also treated with the phosphite anion and tested for activity. The results are shown in Table III.

TABLE III
TREATMENT OF CATALYST A WITH PHOSPHATE ANIONS
1-2 Hr. Treat, Solutions Equivalent in Molarity to 0.34 Wt. % MAP Calcined 2 Hours at 1000° F.; 1500 cc of solution/200 g catalyst

| Run No. | 14 | 15 | 16 |
|---|---|---|---|
| Reagent | $H_3PO_3$ | $NH_3 + H_3PO_3$ | $NH_3 + H_3PO_3$ |
| Initial pH | 2.3 | 3.5 | 4.5 |
| Final pH | 4.4 | 5.0 | 5.0 |
| Anion Conc., Mol/l | | | |
| $H_3PO_3$ | $7.94 \times 10^{-4}$ | $1.37 \times 10^{-4}$ | $3.13 \times 10^{-5}$ |
| $H_2PO_3^{-1}$ | .0284 | .0288 | .0281 |
| $HPO_3^{-2}$ | $4.46 \times 10^{-5}$ | $3.58 \times 10^{-4}$ | $1.10 \times 10^{-3}$ |
| MAT, LV % | 71.2 | 70.0 | 71.0 |
| P, Wt. % | .52 | .43 | .47 |

As can be seen from Table III, treatment with the dihydrogen phosphite anion in runs No. 14, 15 and 16 increased the catalytic activity of the treated catalyst (see MAT activity above 64.3) relative to untreated catalyst A which had a MAT activity of about 64.3. Runs 14, 15 and 16 were runs in accordance with the present invention.

Catalyst A was also treated with organophosphorous compounds and tested for activity. The results are summarized in Table IV.

TABLE IV
CATALYST A TREATS WITH ORGANOPHOSPHOROUS COMPOUNDS
CONCENTRATION: Molar Equivalent to 0.33 Wt. % MAP Calcined 2 Hours at 1000° F.; 1500 cc of solution/200 g catalyst One 2-Hr. Exchange at Room Temp.

| Run No. | 17 | 18 | 19 | 20 |
|---|---|---|---|---|
| Reagent | Phenylphosphinic Acid | | Phenylphosphonic Acid | |
| $NH_3$ buffered to ~4.5 pH | No | Yes | No | Yes |
| P, Wt. % | 0.20 | 0.07 | 0.39 | 0.24 |
| Steamed Catalyst | | | | |
| MAT, LV % | 65.9 | 60.9 | 63.2 | 65.1 |
| Surface Area, $m^2/g$ | 173 | 183 | 186 | — |

Runs No. 17, 18, 19 and 20 were not runs in accordance with the present invention. Although the catalysts had phosphorus contents within the scope of the catalysts of the present invention, treatment of the catalysts with the given organophosphorous compound did not result in the production of catalysts having increased activity in catalytic cracking of hydrocarbons as shown by the MAT results.

EXAMPLE 3

A catalyst, herein designated catalyst B, was prepared as follows:

A solution was made from 8.8 lbs of NaOH and 44.0 lbs of $H_2O$. Thirty three pounds of kaolin microspheres (60 microns) previously calcined 6 hours at 1900° F. were slurried into the caustic solution followed by 3.3 lbs of powdered (<1 micron) metakaolin. The slurry was placed in a steel drum on rollers inside an oven and held for 30 hours at 90° F. while the drum was rotated at 10 rpm. At the end of the digestion period, the temperature was raised to 210° F. for 13 hours. It was during this period that the Y zeolite crystallized. The drum was then emptied onto a large filter and the solid catalyst washed 6 times on the filter using 7 gallons of water per wash. The filtered product was then given a single exchange with 12 gallons of 9 wt.% $NH_4Cl$ solution at 160° F. for 1 hour to reduce the residual soda content to 2.15 wt.%. After drying for 20 hours at 210° F., the solid product weighed approximately 25 lbs.

The portion of the dried product was further ion exchanged two more times with 5 wt.% ammonium sulfate solution to produce catalyst B. A portion of catalyst B was calcined 4 hours at 1000° F. and divided into two equal portions. One portion was treated for 2 hours at room temperature with a 5 wt.% solution of monoammonium phosphate to produce catalyst C. A second portion was treated in a similar manner with 2.5 wt.% MAP solution to produce catalyst D. All three catalysts were steamed and then tested for activity. The results are summarized in Table V.

TABLE V

| MAP TREATMENT OF CLAY CATALYSTS Calcined 4 hrs at 1000° F. | | | |
|---|---|---|---|
| Catalyst | B | C | D |
| MAP Concentration | None | 5% | 2.5% |
| Na$_2$O, Wt. % | 1.21 | 0.31 | 0.65 |
| P, Wt. % | 0 | 1.66 | 1.35 |
| MAT, LV % | 60.5 | 76.9 | 74.0 |

Catalysts C and D are catalysts in accordance with the present invention.

EXAMPLE 4

To determine whether a dihydrogen phosphate anion treatment of Y-type zeolites other than clay derived Y zeolites could improve the catalyst activity, catalysts comprising Y-type zeolites that were not derived from clay, were treated and tested as follows: A catalyst was made from sodium Y-type zeolite, clay, and silica derived from a silica sol. After washing and partial removal of the sodium, the catalyst, herein designated catalyst E, was calcined at different conditions. Two hundred gram portions of the calcined catalyst were given mild treatments with 1500 cc of MAP solutions using different concentrations shown in Table VI. All treatments were for 2 hours at room temperature. After calcining and steaming, the catalysts were tested for activity. The results are summarized in Table VI. The activity of catalyst E was not promoted by any of the given MAP treatments.

changed zeolite was then calcined before incorporating it in the catalyst matrix. After calcining, the unit cell size of the zeolite was 24.51 Å. A catalyst was prepared by spray drying a mixture of this zeolite, alumina powder, and a silica-alumina gel. The alumina was added to simulate the free alumina believed to be present in the clay derived catalysts such as catalysts A and B. The nominal composition of spray dried catalyst L was 25 wt.% zeolite, 20 wt.% alumina powder, and 55 wt.% silica-alumina gel. After washing to reduce soda level, catalyst L was calcined for 4 hours at 1000° F. Two portions of this calcined catalyst were treated with solutions of MAP at room temperature to produce catalysts M and N. It can be seen from the data in Table VII, that although a considerable amount of phosphorus was added to these catalysts by the treatment, activity was not improved as it was by similar treatments of clay derived catalysts such as A and B.

TABLE VII

| Catalyst | L | M | N |
|---|---|---|---|
| MAP Solution, Wt. % | 0 | 5.0 | 2.7 |
| Treatment | None | 2–3 Hr Treat | 1–2 Hr Treat |
| P, Wt. % | 0 | 2.25 | 0.77 |
| MAT Conversion, LV % | 64.7 | 59.7 | 63.0 |

Catalysts L, M and N are not catalysts in accordance with the present invention.

What is claimed is:

1. A catalyst comprising a crystalline aluminosilicate zeolite prepared from a clay starting material, a residue derived from said clay, and an effective amount of phosphorus, said catalyst having been prepared by the steps which comprise:
   (a) ion exchanging a clay derived alkali metal-containing Y-type crystalline aluminosilicate zeolite and the clay derived residue with a cation other than an alkali metal to decrease the alkali metal content of said alkali metal-containing zeolite;
   (b) calcining the resulting ion exchanged zeolite and clay derived residue, and
   (c) contacting the resulting calcined zeolite and clay derived residue with a medium comprising an anion selected from the group consisting of a dihydrogen phosphate anion, a dihydrogen phosphite

TABLE VI

| | MAP TREATMENT OF CATALYST E 25% Y in Silica-Clay Matrix One 2-Hr. Treatment at Room Temperature | | | | | | |
|---|---|---|---|---|---|---|---|
| Catalyst | E | F | G | H | I | J | K |
| Calcined Catalyst | | | | | | | |
| Hrs. @°F. | 2 @ 1000 | 4 @ 1000 | 4 @ 1000 | 4 @ 600 | 4 @ 600 | 4 @ 800 | 4 @ 800 |
| Unit Cell, Å | — | — | — | 24.64 | 24.64 | 24.58 | 24.58 |
| Crystallinity, % | — | — | — | — | — | — | — |
| MAP Solution, Wt. % | 0 | 2.5 | 0.3 | 0 | 0.3 | 0 | 0.3 |
| Steamed Catalyst | | | | | | | |
| P, Wt. % | — | 0.63 | 0.27 | — | 0.20 | — | 0.23 |
| Na$_2$O, Wt. % | 0.92 | 0.53 | 0.72 | — | — | — | — |
| MAT Conv., LV % | 31.8 | 26.9 | 30.4 | 28.0 | 25.0 | 25.5 | 27.6 |

EXAMPLE 5

A second catalyst, herein designated catalyst L, was prepared to determine whether a dihydrogen phosphate anion treatment of a catalyst containing a Y-type zeolite not derived from clay could improve activity. In this example, the sodium Y zeolite, from a fully synthetic source, was ion exchanged with (NH$_4$)NO$_3$, so as to contain approximately 2.0 wt.% Na$_2$O. The ion exanion and mixtures thereof for a time sufficient to composite said effective amount of phosphorus with said calcined zeolite and residue.

2. The catalyst of claim 1 wherein said catalyst additionally comprises clay.

3. The catalyst of claim 1 or claim 2 wherein said catalyst additionally comprises an inorganic oxide selected from the group consisting of silica, alumina, silica-alumina, zirconia, boria, titania, magnesia and mixtures thereof.

4. The catalyst of claim 1 wherein said catalyst comprises at least about 0.1 weight percent of said phosphorus, based on the weight of said zeolite plus residue.

5. The catalyst of claim 1 wherein said catalyst comprises at least about 0.2 weight percent of said phosphorus, based on the weight of said zeolite plus residue.

6. The catalyst of claim 1 wherein said catalyst comprises from about 2 to about 70 weight percent of said zeolite.

7. The catalyst of claim 1 wherein said calcination is conducted at conditions such as to decrease the unit cell size of said zeolite by an amount ranging from about 0.05 to 0.10 angstroms from its initial unit cell size of about above 24.5 angstroms.

8. The catalyst of claim 1 wherein said calcination is conducted at a temperature ranging from about 500° F. to about 1400° F.

9. The catalyst of claim 1 wherein said anion is derived from a phosphorus-containing component selected from the group consisting of inorganic acids of phosphorus, salts of an inorganic acid of phosphorus and mixtures thereof.

10. The catalyst of claim 9 wherein said anion is derived from a phosphorus-containing component selected from the group consisting of phosphorous acid ($H_3PO_3$), phosphoric acid ($H_3PO_4$), salts of phosphorous acid, salts of phosphoric acid and mixtures thereof.

11. The catalyst of claim 1 wherein said contacting step with said anion is conducted at a pH ranging from 2 to 8.

12. The catalyst of claim 1 wherein said anion is present in said medium of step (c) in an amount ranging from about 0.2 to about 10 weight percent.

13. In the process of preparing a Y-type crystalline aluminosilicate zeolite from a clay starting material and an additional source of silica and wherein an alkali metal-containing crystalline aluminosilicate zeolite derived from clay and a clay derived residue are ion exchanged with a cation other than an alkali metal to decrease the alkali metal content of said zeolite and the ion exchanged zeolite and clay derived residue are calcined, the improvement which comprises contacting the calcined ion exchanged zeolite and residue with a medium comprising an anion selected from the group consisting of dihydrogen phosphite anion, dihydrogen phosphate anion and mixtures thereof, to composite at least a portion of phosphorus with said zeolite and residue.

14. The process of preparation of claim 13 wherein said contacting step with said anion is conducted for a time sufficient to composite at least about 0.2 weight percent phosphorus with said zeolite and residue.

15. The process of preparation of claim 13 wherein said contacting step with said anion is conducted for a time sufficient to composite at least about 0.1 weight percent phosphorus with said zeolite and residue.

16. The process of preparation of claim 13 wherein said anion is derived from a phosphorus-containing component selected from the group consisting of inorganic acids of phosphorus, salts of inorganic acids of phosphorus and mixtures thereof.

17. The process of preparation of claim 13 wherein said anion is derived from a phosphorus-containing component selected from the group consisting of phosphoric acid, salts of phosphoric acid, phosphorous acid, salts of phosphorous acid and mixtures thereof.

18. The process of preparation of claim 13 wherein said anion is a dihydrogen phosphate anion derived from monoammonium phosphate, diammonium phosphate and mixtures thereof.

19. The process of preparation of claim 13 wherein said contacting step with the anion is conducted at pH ranging from about 2 to about 8.

20. The process of preparation of claim 13 wherein said anion is present in said medium in an amount ranging from about 0.2 to about 10 weight percent.

21. The process of claim 13 wherein said cation other than an alkali metal cation is selected from the group consisting of hydrogen, hydrogen ion precursors and mixtures thereof.

22. The process of preparation of claim 13 wherein said calcination is conducted at conditions such as to decrease the unit cell size of said zeolite by an amount ranging from about 0.05 to 0.10 angstroms from its initial unit cell size of above about 24.5 angstroms.

23. The process of preparation of claim 13 wherein said calcination is conducted at a temperature ranging from about 500° F. to about 1400° F.

24. The process of preparation of claim 13 wherein said source of additional silica is selected from the group consisting of alkali metal silicate, exothermed, kaolin, aqueous silica sol and mixtures thereof.

25. The process of preparation of claim 13 wherein said clay starting material is a calcined clay which has undergone the kaolin exotherm.

26. The process of preparation of claim 13 wherein said Y-type crystalline aluminosilicate is prepared by the steps which comprise: reacting particles comprising: (1) calcined kaolin clay which has undergone the kaolin exotherm; (2) powdered metakaolin and (3) a sodium hydroxide solution until a sodium form crystalline aluminosilicate Y-type zeolite crystallite is in said particles and a sodium silicate mother liquor is produced, separating from said mother liquor the resulting particles comprising the sodium Y-type crystalline aluminoscilicate crystals and the sodium Y-type crystalline aluminosilicate crystals and a silica-alumina residue of the calcined kaolin clay, decreasing the sodium content of said particles by ion exchange with a non-alkali metal cation, calcining the resulting exchanged particles, the improvement which comprises contacting the calcined ion exchanged particles with an anion selected from the group consisting of dihydrogen phosphite anion, a dihydrogen phosphate anion and mixtures thereof to composite with said particles at least a portion of phosphorus, and recovering particles having increased catalytic activity.

27. The process of preparation of claim 26 wherein said particles are microspheres.

28. The catalyst of claim 1 wherein said catalyst comprises from about 0.1 weight percent to about 0.8 weight percent of said phosphorus, based on the weight of said zeolite plus residue.

* * * * *